E. R. GREER & A. KRIEG.
GEARING.
APPLICATION FILED MAY 12, 1913.
1,146,564. Patented July 13, 1915.
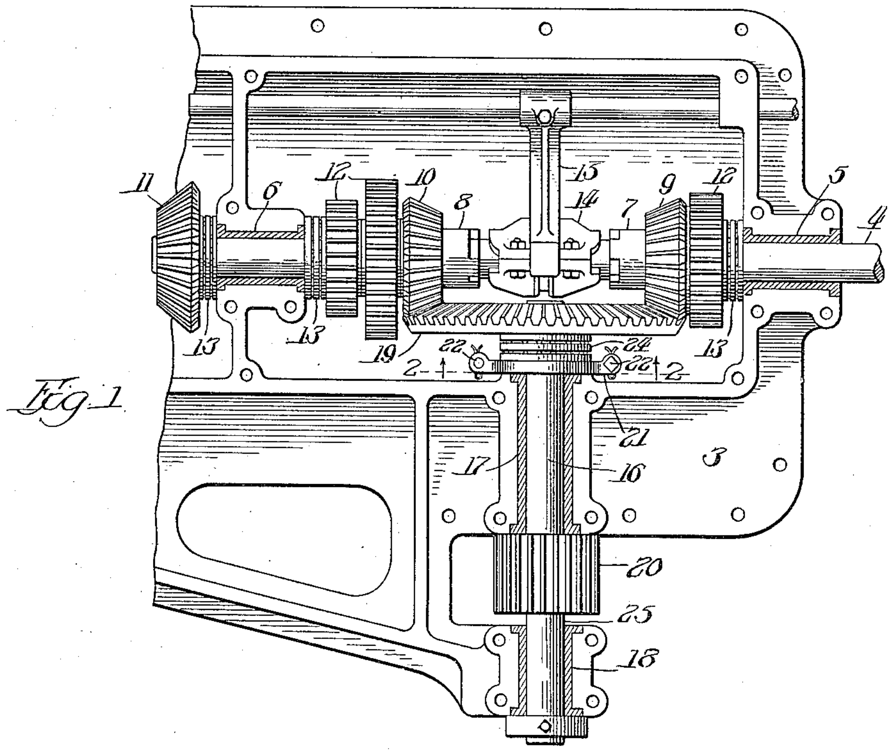
Fig. 1
Fig. 2
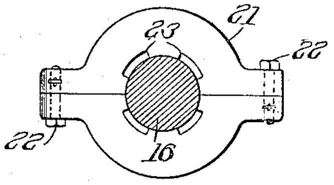
Witnesses:
Geo. C. Larison
John F. McCanna Jr.
Inventors:
Edward R. Greer
Alfred Krieg
by A. O. Behel
Atty.
COLUMBIA PLANOGRAPH CO., WASHINGTON, D. C.

BEST AVAILABLE COPY

UNITED STATES PATENT OFFICE.

EDWARD R. GREER AND ALFRED KRIEG, OF MINNEAPOLIS, MINNESOTA, ASSIGNORS TO EMERSON-BRANTINGHAM COMPANY, OF ROCKFORD, ILLINOIS, A CORPORATION OF ILLINOIS.

GEARING.

1,146,564. Specification of Letters Patent. Patented July 13, 1915.

Application filed May 12, 1913. Serial No. 767,072.

*To all whom it may concern:*

Be it known that we, EDWARD R. GREER and ALFRED KRIEG, citizens of the United States, residing at Minneapolis, in the county of Hennepin and State of Minnesota, have invented certain new and useful Improvements in Gearing, of which the following is a specification.

This invention relates to the mounting of gears and more particularly to the mounting of meshing gears carried by separate shafts.

It is the object of this invention to provide means coöperative in the mounting of the gears whereby either of the shafts carrying the meshing gears may be removed from their operative position.

Referring more particularly to the construction of gearing disclosed therein, where two bevel-pinions mounted upon a shaft, each having their thrust against separate fixed bearings, are both in mesh with a single intermediate bevel gear mounted upon a shaft and also having its thrust against a fixed bearing, it is our object to provide means whereby either of the shafts carrying said gears may be removed from their mounting without displacing any of the gears in their connections with their shafts.

In the accompanying drawings:—Figure 1 shows a form of gear mounting illustrating the object of our invention. Fig. 2 is a detail view of the removable collar mounted upon the counter-shaft, as taken on the line 2—2 of Fig. 1.

To illustrate a condition of gear mounting to which our invention applies, a fragmentary embodiment of gear transmission mechanism is shown in the drawings, in which the casing for inclosing the transmission mechanism is formed in sections and the top section is removed, thus leaving the bottom section 3 and the gearing open to view. A drive-shaft 4 is mounted in journal bearings 5 and 6 which are formed fixed with the casing 3, and mounted upon said shaft are clutch members 7 and 8 loose upon the shaft and each carrying fixedly therewith the bevel pinions 9 and 10, respectively, drive bevel-gear 11 fixedly secured to the shaft, spur-gears 12 adapted to coöperate with change speed gears (not shown), and roller bearings 13 adjacent the journal bearings 6 and 7 to take the side thrust of the gears. A clutch member 14 is splined to shaft 4 and slidable into and out of engagement with clutch members 7 and 8 by the operable member 15. A counter-shaft 16 is mounted in the fixed journal bearings 17 and 18 and carries fixedly therewith the bevel gear 19 in mesh with both gears 9 and 10, and carries also the spur-gear 20 adapted for driving purposes. A split collar 21 secured together by bolts 22 and having oil openings 23 is mounted loose upon shaft 16 adjacent the inner end of bearing 17, and a roller bearing 24 is mounted intermediate said collar and gear 19 to take the thrust from said gear.

When in operation drive-shaft 4 is continuously driven and by shifting clutch member 15, the counter-shaft 16 may be rotated in either direction through the gearing. This relation of gear mounting will serve to illustrate our invention and further description of the transmission mechanism is deemed unnecessary.

In transmission mechanism of the above character, not embodying our improvements, when it is desired to remove either of the shafts for the repair of any of the members carried thereby, it is necessary, because of the three meshing gears and the fixed bearings, to remove both shafts together, raising straight up, as it will readily be seen that one of the shafts cannot be removed by itself unless either certain gears were moved on their shaft out of mesh, a shaft removed longitudinally from one of the gears, or that either shaft carrying a gear fixed be moved longitudinally in its bearing. These mentioned means for removal are very unsatisfactory, resulting in expended time and often injury to the parts in so endeavoring to remove them. In our improved construction by removing the collar 21, the shaft 16 may be moved longitudinally the distance of the width of said collar to disengage the gear 19 from the pinions, a clearance 25 between one face of bearing 18 and gear 20 being allowed for such movement. This done, either of the shafts may be removed separately and entire with the parts carried thereby in their working positions; and where formerly it required two men, one handling each shaft, to remove or assemble the gearing, the task may be accomplished easily by one man.

We claim as our invention.

1. In gearing, the combination of a pair of relatively fixed coaxial split bearings spaced apart, a shaft journaled in said bearings, a pair of bevel-gears interposed between said bearings and mounted on said shaft, a split bearing arranged on an axis at right angles to the said shaft and being fixed with respect to the first named bearings, a shaft journaled in the single bearing, a bevel-gear mounted on the latter shaft and being in mesh with the two bevel-gears, the mounting of said gears on their respective shafts being such that the gears are precluded by said bearings from moving out of mesh, the said gear mounting including an element interposed between one of the gears and the bearing adjacent thereto and being constructed and arranged so as to be removable from the mounting without disturbing the bearings, whereby one of the gears may be moved axially out of mesh to permit either shaft to be raised from its bearing.

2. In gearing, the combination of a pair of spaced coaxial bearings, and a bearing interposed between said bearings and having its axis at right angles to that of said bearings, a shaft journaled in the pair of bearings, a pair of bevel-gears mounted on said shaft intermediate said bearings, a shaft journaled in the single bearing, a bevel-gear mounted on the latter shaft and being in mesh with the pair of bevel gears, means interposed between and abutting each bevel-gear and the bearing adjacent thereto for precluding the gears from unmeshing, said means including an element removable to permit one of the gears to be moved axially to an unmeshing position.

3. In combination, in a gear transmission mechanism, a casing having three relatively fixed bearings, two bearings being coaxial and the third bearing on an axis intermediate and at right angles to that of the coaxial bearings, a shaft journaled in the coaxial bearings and a shaft journaled in the single bearing, a pair of bevel-gears mounted on the first named shaft and being interposed between the coaxial bearings, a bevel-gear mounted on the second named shaft and being in mesh with the bevel-gears, and means mounted on the shafts interposed between and abutting the bevel-gears and the bearings adjacent thereto for precluding the gears from being unmeshed, said means including an element movable out of operative position to permit one of the gears to be moved axially to and unmeshing position.

In testimony whereof we have hereunto set our hands in presence of two subscribing witnesses.

EDWARD R. GREER.
ALFRED KRIEG.

Witnesses:
C. F. NELSON,
H. M. STREET.

Copies of this patent may be obtained for five cents each, by addressing the "Commissioner of Patents, Washington, D. C."